ized United States Patent (12) United States Patent
Boeke et al.

(10) Patent No.: US 9,400,584 B2
(45) Date of Patent: Jul. 26, 2016

(54) ALIAS SELECTION IN MULTIPLE-ALIASED ANIMATIONS

(75) Inventors: Ruurd Johan Boeke, Redmond, WA (US); Hamid Mahmood, Seattle, WA (US); Terry A. Adams, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 473 days.

(21) Appl. No.: 13/229,586

(22) Filed: Sep. 9, 2011

(65) Prior Publication Data

US 2013/0067372 A1     Mar. 14, 2013

(51) Int. Cl.
G06T 13/80      (2011.01)
G06F 3/0481     (2013.01)

(52) U.S. Cl.
CPC .......... *G06F 3/0481* (2013.01); *G06F 3/04817* (2013.01); *G06T 13/80* (2013.01)

(58) Field of Classification Search
CPC ... G06F 19/322; G06Q 30/0243; G06T 13/00
See application file for complete search history.

(56) References Cited

U.S. PATENT DOCUMENTS

| 5,261,041 | A   | 11/1993 | Susman |
| 5,548,693 | A   | 8/1996 | Shinya |
| 6,204,828 | B1 * | 3/2001 | Amir et al. .................. 345/7 |
| 6,314,439 | B1  | 11/2001 | Bates et al. |

| 6,323,884 | B1 | 11/2001 | Bird et al. |

(Continued)

FOREIGN PATENT DOCUMENTS

| CN | 1613057 A   | 5/2005 |
| CN | 101223555 A | 7/2008 |

(Continued)

OTHER PUBLICATIONS

"Animation in Alias", Retrieved on: Aug. 17, 2011, Available at: http://www.autodesk.com/techpubs/aliasstudio/2010/index.html?url=WS1a9193826455f5ff4e421d7d11bf108001d-694b.htm,topicNumber=d0e47156.

(Continued)

*Primary Examiner* — Ryan D McCulley
(74) *Attorney, Agent, or Firm* — Timothy Churna; Aaron Hoff; Micky Minhas (57) ABSTRACT

A computer system determines that various user interface (UI) elements are to be moved to a different position within the UI. The computer system initiates a first animation that creates first and second aliases for each UI element that is to be moved. The computer system then receives an input that interrupts the initiated first animation. The input indicates that at least one of the UI elements that is being moved during the first animation is to be moved to a different position. The computer system then determines which of the first and second aliases is optimal for use as a starting point for a second animation based on various visibility factors, and initiates a second animation at the determined optimal alias. The second animation uses the determined optimal alias as a starting point and a third, different alias as an end point.

20 Claims, 4 Drawing Sheets

(56) References Cited

U.S. PATENT DOCUMENTS

| | | | |
|---|---|---|---|
| 7,477,254 | B2 | 1/2009 | Nelson et al. |
| 8,120,610 | B1 * | 2/2012 | Stratton .................. 345/440 |
| 8,464,173 | B2 * | 6/2013 | Victor .................... 715/765 |
| 2005/0213041 | A1 | 9/2005 | Schmelzer |
| 2006/0047804 | A1 | 3/2006 | Fredricksen et al. |
| 2006/0109242 | A1 * | 5/2006 | Simpkins ............... 345/156 |
| 2006/0236257 | A1 | 10/2006 | Othmer et al. |
| 2007/0013699 | A1 | 1/2007 | Nelson et al. |
| 2009/0064012 | A1 * | 3/2009 | Tremblay ........... G06F 3/0481 715/764 |
| 2010/0077345 | A1 * | 3/2010 | Swingler ........... G06F 3/0481 715/802 |
| 2010/0235793 | A1 * | 9/2010 | Ording et al. .......... 715/863 |
| 2011/0099492 | A1 | 4/2011 | Park et al. |

FOREIGN PATENT DOCUMENTS

| | | |
|---|---|---|
| CN | 101651738 A | 2/2010 |
| CN | 101980191 A | 2/2011 |
| EP | 1326210 | 10/2003 |

OTHER PUBLICATIONS

"Canvas Animations in HTML5", Retrieved on: Aug. 17, 2011, Available at: http://www.wintellect.com/CS/blogs/jprosise/archive/2011/04/03/canvas-animations-in-html5.aspx.

"Core Animation—The Animator Proxy", Retrieved on: Aug. 17, 2011, Available at: http://www.ottersoftwareblog.com/blog/2010/5/23/core-animation-the-animator-proxy.html.

"First Office Action and Search Report Issued in Chinese Patent Application No. 201210331159. 2", Mailed Date: Feb. 4, 2015, 15 Pages.

"Supplementary Search Report Issued in European Patent Application No. 12829874.2", Mailed Date: Aug. 7, 2016, 6 Pages.

"Second Office Action Issued in Chinese Patent Application No. 201210331159.2", Mailed Date: Oct. 8, 2015, 7 Pages.

* cited by examiner

ALIAS SELECTION IN MULTIPLE-ALIASED ANIMATIONS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Software applications have various different types of user interfaces that allow users to interact with the applications. Some applications have graphical user interfaces that employ graphics such as icons, pictures, windows and other graphical elements with which a user can interact. In some cases, these graphical elements are displayed according to a predefined layout, such as a grid or list. When such predefined layouts are used, movement of existing elements or the addition of new elements may disrupt or change the existing layout of elements. When such changes occur, animations may be used to graphically show how the changes are taking place.

BRIEF SUMMARY

Embodiments described herein are directed to determining an appropriate alias to select after an animation interruption and to determining which user interface element a user is currently focused on. In one embodiment, a computer system determines that various user interface (UI) elements are to be moved to a different position within the UI. The computer system initiates a first animation that creates first and second aliases for each UI element that is to be moved. The computer system then receives an input that interrupts the initiated first animation. The input indicates that at least one of the UI elements that is being moved during the first animation is to be moved to a different position. The computer system then determines which of the first and second aliases is optimal for use as a starting point for a second animation based on various visibility factors, and initiates a second animation at the determined optimal alias. The second animation uses the determined optimal alias as a starting point and a third, different alias as an end point.

In another embodiment, a computer system receives input from a user at a user interface (UI). The computer system identifies UI elements that are currently changing positions during an animation initiated by the received input. The computer system accesses various visibility factors, each of which at least partially identifies which UI elements a user is focused on. Then, based on one or more of the accessed visibility factors, the computer system determines which UI element of the plurality of elements the user is currently focused on.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which:

FIG. 3 illustrates a flowchart of an example method for determining which user interface element a user is currently focused on.

DETAILED DESCRIPTION

Embodiments described herein are directed to determining an appropriate alias to select after an animation interruption and to determining which user interface element a user is currently focused on. In one embodiment, a computer system determines that various user interface (UI) elements are to be moved to a different position within the UI. The computer system initiates a first animation that creates first and second aliases for each UI element that is to be moved. The computer system then receives an input that interrupts the initiated first animation. The input indicates that at least one of the UI elements that is being moved during the first animation is to be moved to a different position. The computer system then determines which of the first and second aliases is optimal for use as a starting point for a second animation based on various visibility factors, and initiates a second animation at the determined optimal alias. The second animation uses the determined optimal alias as a starting point and a third, different alias as an end point.

In another embodiment, a computer system receives input from a user at a user interface (UI). The computer system identifies UI elements that are currently changing positions during an animation initiated by the received input. The computer system accesses various visibility factors, each of which at least partially identifies which UI elements a user is focused on. Then, based on one or more of the accessed visibility factors, the computer system determines which UI element of the plurality of elements the user is currently focused on.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

Figure 1:
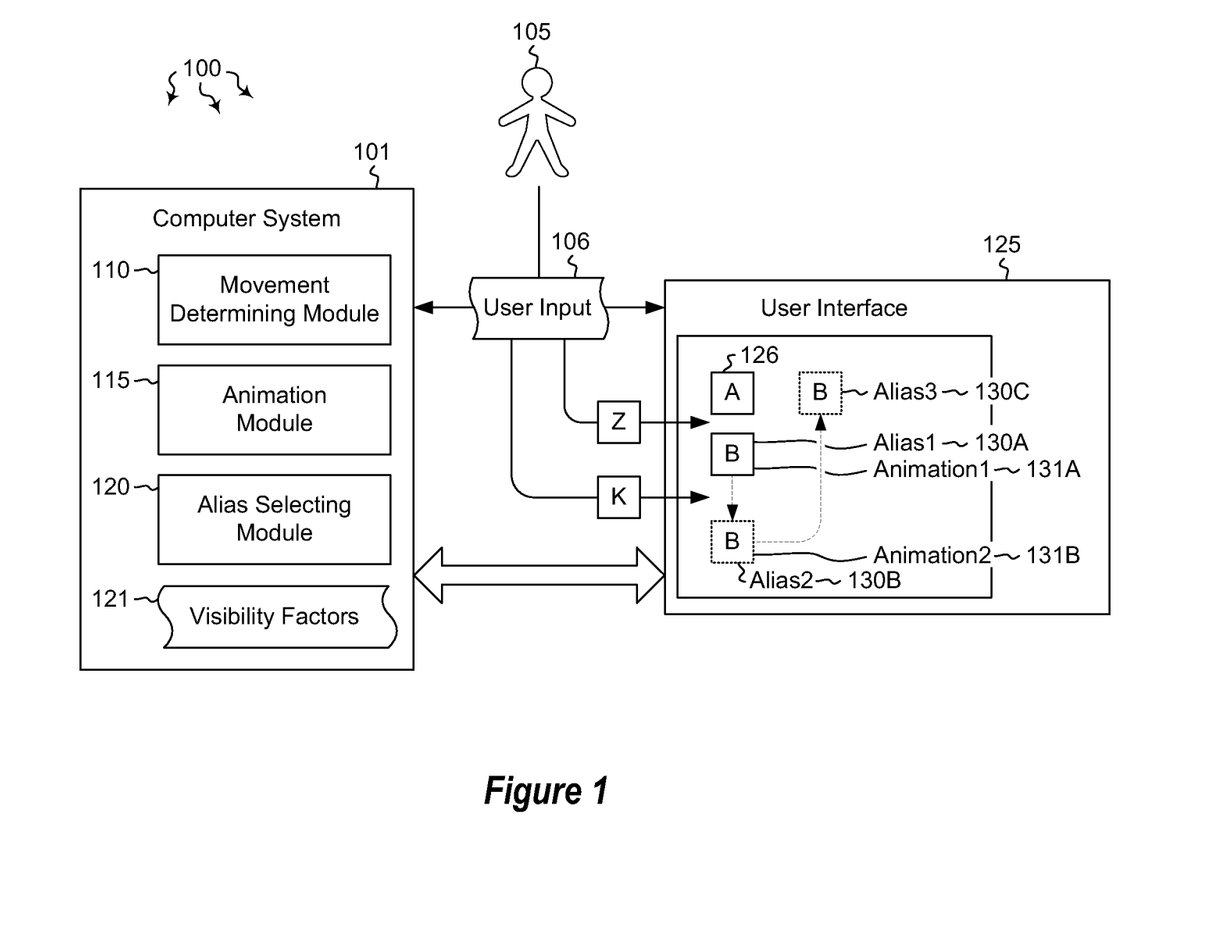
FIG. 1 illustrates a computer architecture in which embodiments of the present invention may operate including determining an appropriate alias to select after an animation interruption.

FIG. 1 illustrates a computer architecture 100 in which the principles of the present invention may be employed. Computer architecture 100 includes computer system 101. Computer system 101 may be any type of local or distributed computer system including a cloud computer system. The computer system may have various different modules for performing different functionality. This functionality may be displayed on user interface (UI) 125. The user interface may be capable of receiving various types of user inputs 106 including mouse inputs, keyboard inputs, touchscreen or other touch inputs or any other form of user interaction. The UI allows the users of the computer system (e.g. user 105) to interact with different software applications and different functionality modules of the computer system.

In some cases, the UI 125 may be configured to display various different visual elements 126 (e.g. boxes A and B). During the user's interaction with the user interface, the user may indicate other elements that are to be added to the other elements of the display (e.g. boxes Z and K). It will be understood that while only a few visual elements are shown in FIG. 1, substantially any number of visual elements may be displayed within UI 125. The elements may be rearranged or repositioned as new elements are added, or as existing elements are moved. For instance, element Z may be added between elements A and B. When elements are added, moved or deleted, an animation may take place. The animation may show the visual element being moved from one position to another (or being added or removed from the display).

When visual elements are relocated on the screen, an animation may be initiated to fluidly move the element from its old position to a new position. An 'alias' or 'brush' may be used to show the element on the UI screen, while the actual element will have already moved to its new location from the point of view of an underlying layout system (that controls how elements are laid out on the UI. In some cases, multiple aliases (alias1 (130A), alias2 (130B) and/or alias3 (130C)) may be used to represent a visual element.

While an animation is occurring, the element might be moved once again due to a user input that interrupts the animation. For example, element B may be moved to alias2 and then again to alias3. A new animation is then initiated that is started from either the current location of alias1 or alias2. At least in some embodiments, the visual element that is most likely being tracked by the user (or more specifically, the user's eye), is the element (or alias) that is most optimal for starting the new animation. In order to determine which alias is optimal for starting the new animation, multiple different factors may be taken into account: opacity, where the element with the higher opacity is best, clipping, where the element that is least clipped (i.e. is most visible on the screen) is best, distance from last interaction point, where the element that is closest to where the user last interacted with the screen is best, and speed, where the element that is moving the fastest is best. Once it is determined which alias to use, a snapshot of its state is created and used to setup the new animation. These concepts will be explained further below with regard to methods 200 and 300 of FIGS. 2 and 3, respectively.

Figure 2:
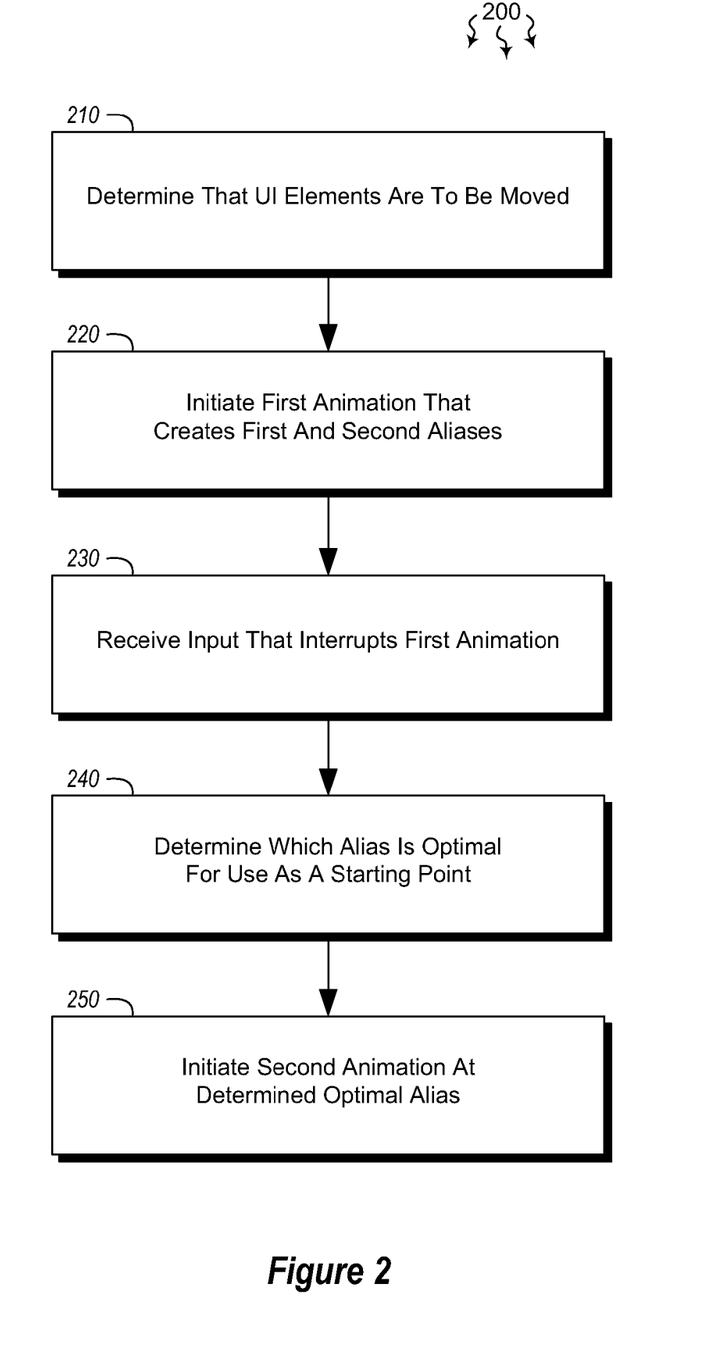
FIG. 2 illustrates a flowchart of an example method for determining an appropriate alias to select after an animation interruption.
Figure 3:
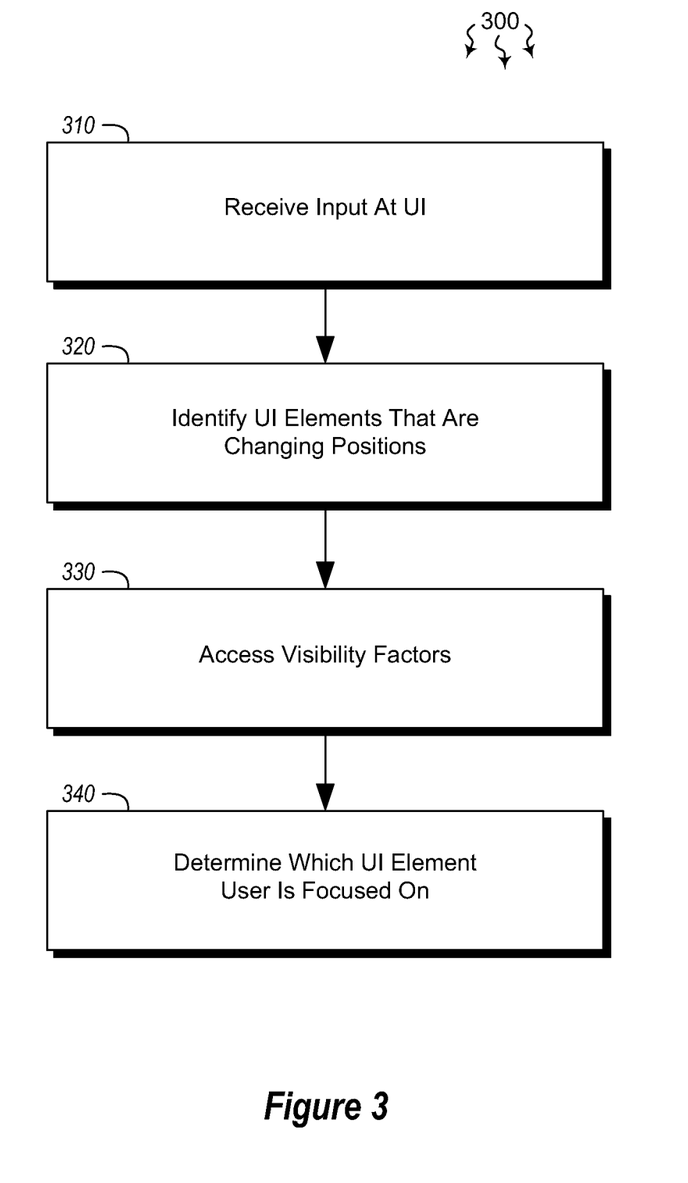

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for determining an appropriate alias to select after an animation interruption. The method 200 will now be described with frequent reference to the components and data of environment 100.

Method 200 includes an act of determining that one or more user interface (UI) elements are to be moved to a different position within the UI (act 210). For example, movement determining module 110 may determine that element Z is to be added between elements A and B in UI 125. If the underlying layout system is a grid system (substantially any type of layout may be used including list form, circular form, and others), then element B will be moved down to accommodate the inclusion of element Z. Accordingly, as element B is to be moved, an animation will be created to move element B downward within the UI.

Method 200 includes an act of initiating a first animation that creates first and second aliases for each UI element that is to be moved (act 220). For example, animation module 115 of computer system 101 may initiate an animation (animation) (131A)) to move element B downward to make room for element Z. Alias1 (130A) may be created at element B's current location when the input to add element Z is received. Alias2 (130B) is also created. Thus, element B is animated to look as if it were moving from its original position at alias1 to its new position at alias 2.

Next, method 200 includes an act of receiving an input that interrupts the initiated first animation, the input indicating that at least one of the UI elements that is being moved during the first animation is to be moved to a different position (act 230). For example, UI 125 may receive another user input 106 that interrupts the first animation (moving from alias1 to alias2). For instance, element K may be added between elements Z and B. If this new element K is added during the animation of element B, then a new animation will be needed to move element B to its updated new position. Accordingly, animation module 115 may create a new alias (alias3) and a new animation (animation2 (131B)) from alias2 to alias3.

In another embodiment in the environment of FIG. 1, if multiple items are added (instead of just Z), then element B will move from the first column to a second column. At this point, two aliases would be created for element B. If, during that animation, another element or set of elements is added (instead of just element K), element B would then be moved to a third column. At that point, the system would then select one of the two previously created aliases as the starting point of the second animation.

When the first animation is interrupted, it may be automatically stopped by the computer system. At this point, state information for one or more of the UI elements in the first animation may be persistently stored in a local or remote data store. As the persistently stored state information may include multiple different details about the visual elements' current state, this information may be used to determine which alias is optimal for use as a starting point for the second animation. In some cases, this information may be used to identify visibility factors which assist in identifying which element the user was most likely focused on when the animation began.

Method 200 further includes an act of determining which of the first and second aliases is optimal for use as a starting point for a second animation based on one or more visibility factors (act 240). Alias selecting module 120 may determine whether alias2 or alias3 is the optimal alias for use as a starting point for animation2 (131B). The optimal alias, at least in some embodiments, is the alias of the display element that is most likely currently being tracked or viewed by the user. Choosing the element that is currently being viewed allows the second transition to be more fluid and less jarring to the eye.

Figure 4A:
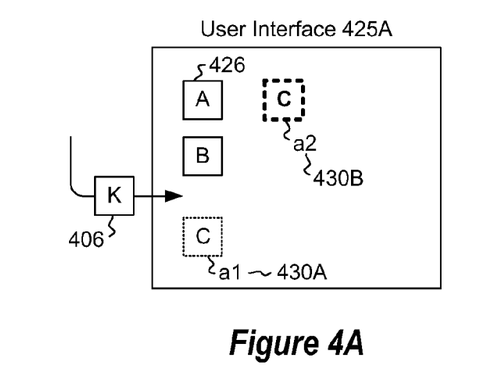
FIGS. 4A-4D illustrate embodiments in which different visibility factors are used to determine where the user is currently looking.

As mentioned above, various different visibility factors may be used to indicate which UI element the user's eyes are currently tracking. The term "visibility factors", as used herein, may refer to any portion of data that would indicate where the user's eyes are currently looking Thus, one visibility factor 121 may be opacity. When opacity is used as a determining factor, the alias of the UI element with the highest opacity is determined to be the optimal starting point for the second animation. As shown in FIG. 4A, element K 406 is being added between display elements (426) B and C in UI 425A. Element C is being moved from its position at alias a1 (430A) to a new position at alias a2 (430B). The animation in this embodiment involves fading out the element in its old position and fading it in to its new position. As indicated by the relatively lighter and darker lines, the element represented by alias a2 is darker than the element represented by alias a1. Accordingly, in this case, the computer system would determine that because the element at a2 was darker in opacity, the user is most likely looking at the element of alias a2, and therefore should begin the second animation at alias a2.

Figure 4B:
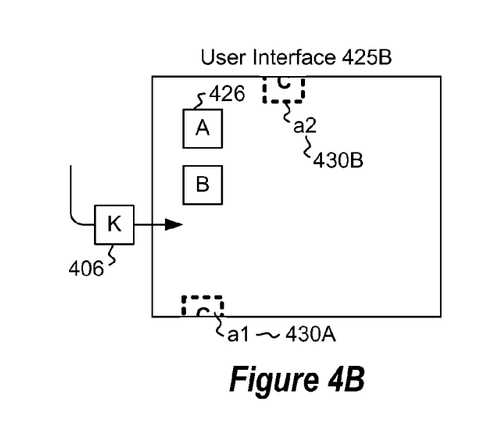

In another embodiment, at least one of the visibility factors may include clipping, so that the alias of the UI element that is the least clipped is determined to be the optimal starting point for the second animation. As shown in UI 425B of FIG. 4B, element K (406) is being added between elements B and C. The animation in this embodiment involves moving element C down through the bottom of the screen and down from the top of the screen into a new column of elements. While the element is being moved during the animation, the element may begin by being 100% in the left column and move slowly down so that as more of the element is clipped by the bottom of the screen, the portion that is clipped is shown in the next column over. The element has a different alias in each column. Thus, element C may begin at alias a1 (430A) and move downward toward its new position at alias a2 (430B). In some cases, whichever element is the least clipped is determined to be the most likely viewed element, and is thus the most optimal starting point for the second animation.

Figure 4C:
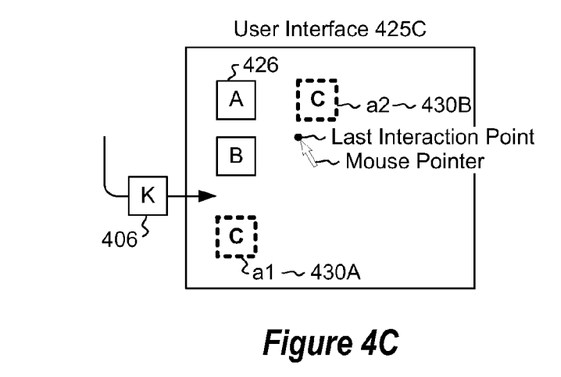

In another embodiment, at least one of the visibility factors includes the distance from the last user interaction point. Thus, computer system 101 may determine a last interaction point indicating which UI element in UI 425C the user has last interacted with. Then, the alias of the UI element that is closest to where the user last interacted with the UI is determined to be the optimal starting point for the second animation. Thus, as shown in FIG. 4C, element K (406) is added between elements B and C. The computer system may determine that the last user interaction was with a mouse at the point labeled "last interaction point". The computer system may then determine that the element at alias a2 (430B) is closer to the last interaction point than the element at alias a1 (430A), and is the better choice for use as a starting point for the second animation.

Figure 4D:
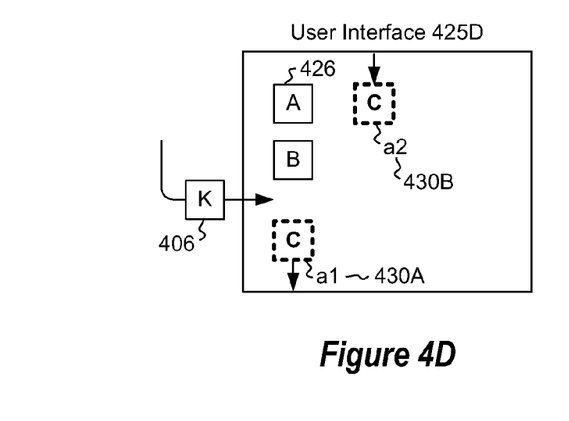

In yet another embodiment, at least one of the visibility factors includes the determined current speed of the UI element. Thus, computer system 101 may determine the current speed at which each UI element is moving as part of the first animation. Using the current speed, the alias selecting module 120 can determine that the alias of the UI element that is moving the fastest is the optimal starting point for the second animation. As user's eyes tend to follow moving objects, the object that is moving the fastest may be the best indicator of where the user is currently looking. Accordingly, as shown in FIG. 4D, element K (406) may be added between elements B and C in UI 425D. In the animation in this embodiment, element C may be moved down from the left column to a column on the right. If, for whatever reason, the element at alias a2 (430B) is moving faster than the element at alias a1 (430A), alias a2 will be used as the starting point for the second animation. It should be noted here that while FIGS. 4A-4D show the use of a single visibility factor, these visibility factors may be used in conjunction with one another. Indeed, substantially any number of visibility factors may be used in the determination of which alias is optimal to use as a starting point for the second (or any subsequent) animation.

Returning to FIG. 2, method 200 includes an act of initiating a second animation at the determined optimal alias, the second animation using the determined optimal alias as a starting point and a third, different alias as an end point (act 250). Thus, whether alias1 (130A) or alias2 (130B) is selected as the optimal choice for starting the second animation, the second animation will be initiated at the chosen alias and will conclude at alias3 (130C). In this manner, when a first animation is interrupted, and a second animation is to be initiated, the second animation will be initiated at the position most likely to be currently viewed by the user.

FIG. 3 illustrates a flowchart of a method 300 for determining which user interface element a user is currently focused on. The method 300 will now be described with frequent reference to the components and data of environment 100.

Method 300 includes an act of receiving input 106 from a user '05 at a user interface (UI) 125 (act 310). Next, the movement determining module 110 identifies UI elements (e.g. 126) that are currently changing positions during an animation (e.g. animation1 (131A) initiated by the received input (act 320). The computer system 101 then accesses one or more visibility factors 121, each of which at least partially identifies which UI elements a user is currently focused on (act 330).

As indicated above, the visibility factors may include opacity, where the alias of the UI element with the highest opacity is determined to be the optimal starting point for the second animation (as shown in FIG. 4A). The visibility factors may further include clipping, where the alias of the UI element that is the least clipped is determined to be the optimal starting point for the second animation. The distance from the last interaction point may also be used as a visibility factor (i.e. as an indication of where the user is currently looking on the UI). The computer system can determine a last interaction point that indicates which UI element the user has last interacted with. Then, the alias of the UI element that is closest to where the user last interacted with the UI is determined to be the optimal starting point for the second animation. The current speed each UI element is moving as part of the first animation can also be used as a visibility factor. In such cases, the alias of the UI element that is moving the fastest is determined to be the optimal starting point for the second animation. Thus, using one or more of the visibility factors, the computer system may determine which UI element of the many different elements displayed in the UI the user is currently focused on (act 340). After the currently-viewed element (or most likely currently viewed element) is determined, the alias of that element is used as a starting point for the second animation.

Accordingly, methods, systems and computer program products are provided which determine an appropriate alias to select after a first animation has been interrupted and a second animation is to be initiated. Moreover, methods, systems and computer program products are provided that determine which user interface element a user is currently focused on and, as a result, which alias is to be used as the starting point for the second animation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method, implemented at a computer system that includes one or more processors, for determining an appropriate location within a user interface (UI) to select for moving an element in a second animation when a first animation for moving the element is interrupted by the second animation, the method comprising:

determining that one or more UI elements are to be moved to a different position within the UI;

initiating the first animation, which creates a first location and a second, different location for a particular UI element that is to be moved as part of the first animation, wherein:

the first location comprises a current location of the particular UI element, such that the first location acts as a first starting point for the first animation, and the second location comprises a first end point for the first animation;

receiving an input initiating the second animation that interrupts the initiated first animation, the UI element that is being moved being displayed during the interrupted first animation, the input indicating that the particular UI element that is being moved during the first animation is to be moved by the second animation to a third location, the third location being different from the first and second locations;

determining, based on a level of opacity at each of the first and second locations, a UI location for starting the second animation, including determining which one of the first and second locations has the highest opacity, and selecting the one of the first and second locations having the highest opacity as the UI location for starting the second animation; and initiating the second animation at the determined UI location, the second animation using the determined UI location as a second starting point for the second animation and the third location as a second end point for the second animation.

2. The method of claim 1, wherein determining the location for starting the second animation is also based on a level of clipping.

3. The method of claim 1, further comprising determining a last user interaction point, wherein the last interaction point indicates with which UI element a user last interacted.

4. The method of claim 3, wherein determining the UI location for starting the second animation is also based on the distance from the last user interaction point.

5. The method of claim 1, further comprising determining a current speed each UI element is moving as part of the first animation.

6. The method of claim 5, wherein determining the UI location for starting the second animation is also based on the determined current speed of each UI element.

7. The method of claim 1, wherein the first animation is stopped upon receiving the input that interrupts the initiated first animation.

8. The method of claim 1, wherein upon receiving the input that interrupts the initiated first animation, state information for one or more of the UI elements in the first animation is persistently stored.

9. The method of claim 8, wherein the persistently stored state information is used to determine which location is optimal for use as a starting point for the second animation.

10. A computer system, comprising:
one or more processors;
system memory; and
one or more computer-readable storage media having stored thereon computer-executable instructions that are executable by the one or more processors to cause the computer system to determine an appropriate location within a user interface (UI) to select for moving an element in a second animation when a first animation for moving the element is interrupted by the second animation, the computer-executable instructions including instructions that are executable to cause the computer system to perform at least the following:
determine that one or more UI elements are to be moved to a different position within the UI;
initiate the first animation, which creates a first location and a second, different location for a particular UI element that is to be moved as part of the first animation, wherein:
the first location comprises a current location of the particular UI element such that the first location acts as a first starting point for the first animation, and
the second location comprises a first end point for the first animation;
receive an input initiating the second animation that interrupts the initiated first animation, the UI element that is being moved being displayed during the interrupted first animation, the input indicating that the particular UI element that is being moved during the first animation is to be moved by the second animation to a third location, the third location being different from the first and second locations;
determine, based on a level of opacity at each of the first and second locations, a UI location for starting the second animation, including determining which one of the first and second locations has the highest opacity, and selecting the one of the first and second locations having the highest opacity as the UI location for starting the second animation; and
initiate the second animation at the determined UI location, the second animation using the determined UI location as a second starting point for the second animation and the third location as a second end point for the second animation.

11. The computer system of claim 10, wherein determining the UI location for starting the second animation is also based on a level of clipping.

12. The computer system of claim 10, wherein determining the UI location for starting the second animation is also based on a distance from a last user interaction point.

13. The computer system of claim 10, wherein a current speed each UI element is moving as part of the first animation is determined.

14. The computer system of claim 13, wherein determining the UI location for starting the second animation is also based on the determined current speed of each UI element.

15. A computer program product comprising one or more hardware storage devices having stored thereon computer-executable instructions that are executable by one or more processors of a computing system to cause the computing system to determine an appropriate location within a user interface (UI) to select for moving an element in a second animation when a first animation for moving the element is interrupted by the second animation, the computer-executable instructions including instructions that are executable to cause the computing system to perform at least the following:
determine that one or more UI elements are to be moved to a different position within the UI;
initiate the first animation, which creates a first location and a second, different location for a particular UI element that is to be moved as part of the first animation, wherein:
the first location comprises a current location of the particular UI element, such that the first location acts as a first starting point for the first animation, and
the second location comprises a first end point for the first animation;
receive an input initiating the second animation that interrupts the initiated first animation, the UI element that is being moved being displayed during the interrupted first animation, the input indicating that the particular UI element that is being moved during the first animation is to be moved by the second animation to a third location, the third location being different from the first and second locations;
determine, based on a level of opacity, a UI location for starting the second animation, including determining which one of the first and second locations has the highest opacity, and selecting the one of the first and second locations having the highest opacity as the UI location for starting the second animation; and
initiate the second animation at the determined UI location, the second animation using the determined UI location as a second starting point for the second animation and the third location as a second end point for the second animation.

16. The computer program product of claim 15, wherein determining the UI location for starting the second animation is also based on a level of clipping.

17. The computer program product of claim 15, wherein a last user interaction point is determined, the last user interaction point indicating with which UI element a user last interacted.

18. The computer program product of claim 17, wherein determining the UI location for starting the second animation is also based on the distance from the last user interaction point.

19. The computer program product of claim 15, wherein a current speed each UI element is moving as part of the first animation is determined.

20. The computer program product of claim 19, wherein determining the UI location for starting the second animation is also based on the determined current speed of each UI element.

* * * * *